(12) United States Patent
Osotio et al.

(10) Patent No.: US 10,366,522 B2
(45) Date of Patent: Jul. 30, 2019

(54) AUGMENTED AND VIRTUAL REALITY BOT INFRASTRUCTURE

(71) Applicant: Microsoft Technology Licensing, LLC, Redmond, WA (US)

(72) Inventors: Neal Osotio, Sammamish, WA (US); Angela Moulden, Ravensdale, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 118 days.

(21) Appl. No.: 15/717,564

(22) Filed: Sep. 27, 2017

(65) Prior Publication Data
US 2019/0096105 A1 Mar. 28, 2019

(51) Int. Cl.
*G06T 15/00* (2011.01)
*G06T 11/60* (2006.01)
*G06F 16/951* (2019.01)

(52) U.S. Cl.
CPC ............ *G06T 11/60* (2013.01); *G06F 16/951* (2019.01)

(58) Field of Classification Search
CPC ........................... G06F 2203/011; G06F 3/011
USPC ....................................................... 345/633
See application file for complete search history.

(56) References Cited

U.S. PATENT DOCUMENTS

| 8,953,889 | B1 | 2/2015 | Worley et al. |
| 2011/0213664 | A1 | 9/2011 | Osterhout et al. |
| 2012/0113092 | A1 | 5/2012 | Bar-Zeev et al. |
| 2012/0158502 | A1 | 6/2012 | Chung et al. |
| 2013/0162677 | A1* | 6/2013 | Maaradji ................ A63F 13/12 345/633 |
| 2013/0278631 | A1 | 10/2013 | Border et al. |
| 2013/0321390 | A1 | 12/2013 | Latta et al. |
| 2014/0361977 | A1* | 12/2014 | Stafford ............ G02B 27/0093 345/156 |
| 2016/0025981 | A1 | 1/2016 | Burns et al. |
| 2016/0133055 | A1* | 5/2016 | Fateh ...................... G06F 3/147 345/633 |
| 2017/0061688 | A1 | 3/2017 | Miller |

* cited by examiner

*Primary Examiner* — Thomas J Lett
(74) *Attorney, Agent, or Firm* — Jeffrey L. Ranck; Ranck IP Law

(57) ABSTRACT

Representative embodiments disclose mechanisms for presenting content into a virtual reality or augmented reality (VR/AR) system in a manner that does not distract the user from their primary workflow in the VR/AR system. The system monitors a user's workflow in a virtual reality or augmented reality (VR/AR) system. Based on the user's workflow, the user's emotional state, and other data, the system selects one or more bots to inject into the user's workflow. The bots provide content and functional extensibility for the system and/or the VR/AR system. Content from the selected bot(s) is identified and placed in a location that is in the periphery of the user at a low rendering fidelity. If the user shows interest in the content, the fidelity of the content is increased until the user can interact with the content, using the functionality provided by the bot.

20 Claims, 11 Drawing Sheets

AUGMENTED AND VIRTUAL REALITY BOT INFRASTRUCTURE

FIELD

This application relates generally to virtual and augmented reality systems. More specifically, this application relates to a bot infrastructure for virtual and augmented reality systems that can provide content which is rendered at differing levels of detail based on a user's engagement and interaction.

BACKGROUND

Virtual reality systems render content in a virtual world and allows a user to interact with the rendered content. Augmented reality systems are similar, however, rendered content is usually superimposed over a view of the real world around the user.

Content provided in a virtual or augmented reality system is often related to a user's workflow (i.e., tasks a user is engaged in). Furthermore, all content that is presented often is presented using the same rendering resolution.

It is within this context that the present embodiments arise.

DETAILED DESCRIPTION

Figure 1:
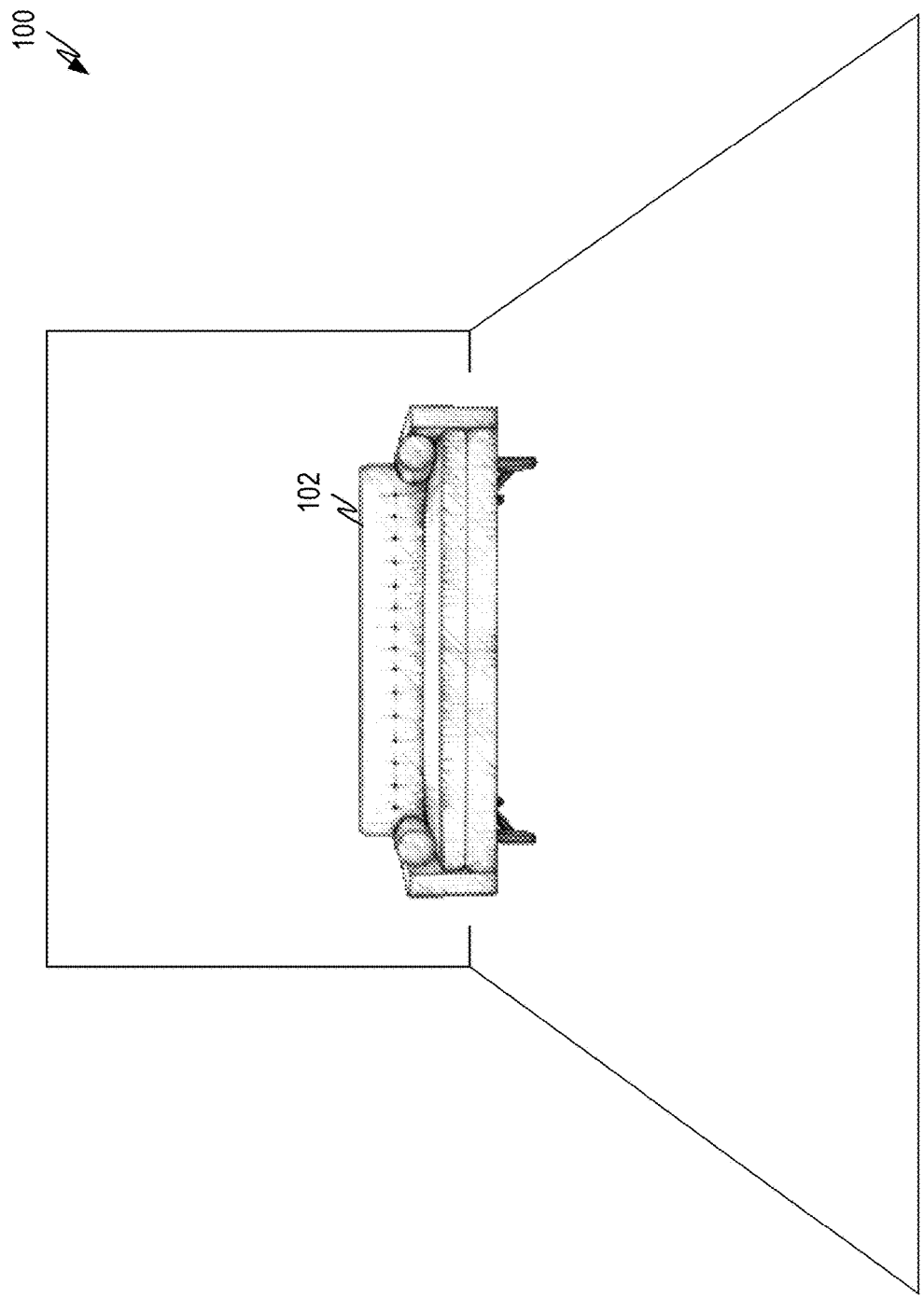
FIG. 1 illustrates an example virtual reality or augmented reality environment according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Presenting information in a distracting manner is inefficient and causes the system to use more resources (bandwidth, processing power/time, memory, graphics processing, and so forth), both because the system has downloaded and presented information not wanted by the user and because the system has distracted the user from their primary workflow and thus will take longer to complete the work. In power limited systems, such as systems that are operating on battery power and systems that have limited hardware capability (memory, processing power, storage space, graphics processing capability, and so forth), this can not only render the user experience unsatisfactory, but also limit the capability and applicability of the system to a given situation or scenario.

The disclosure relates to delivering augmented content to a user in an augmented reality (AR) or virtual reality (VR) experience in a way that both limits distraction to the user and increases the engagement with the user. The content is altered for fidelity, surface location, and/or object characteristics based on the environmental characteristics, user's engagement or interest in the content to decrease user distraction while increasing user interaction. In other words, one of the technical problems solved by this disclosure is to determine how to present information in a way that is acceptable to a user and in a way that does not distract the user from their primary workflow (e.g., the current activities of the user). This eliminates or reduces the download and presentation of unwanted information, preserves system resources (battery power, memory, processing capacity, and so forth), and improves the user experience, thus improving the efficiency and effectiveness of the system.

Augmented content is provided by one or more bots selected based on their relevance to the user's workflow, the emotional state of the user (described below), the AR/VR environment, and so forth. Bots can be associated with a domain, content provider, search result and so forth. Bots can extend the functionality of the system as well as provide content. In other words, bots can provide content as well as functionality that allows the user to interact with the content in ways that are not necessarily native to the system itself.

Augmented content comprises any type of content that would augment, help, or otherwise be of interest to the user or serve a desired purpose. For example, augmented content can be help information, advertising information, new information that a user can consider, information associated with extended functionality provided by a bot and so forth. To further illustrate, suppose the system allows a user to participate in a workflow that designs three dimensional models of a device with multiple component parts such as a drone which may have different propellers, payload holders, drivetrains, and so forth. As a user is struggling with finding the proper combination of components to meet certain design requirements, the system may identify a bot that has a new/different component that may be of use to the designer. The bot may not only provide the component model but may also provide functionality that allows the user to customize the component model, retrieve specifications associated with the component model, and other functionality that will help the user understand the capabilities of the component, integrate the component into the design, produce the design with the new component for manufacturing, and so forth. In this example, the bot can be used to extend the design system to work with the new component part.

The system monitors a wide variety of data graphs/indexes and processes them to ascertain what augmented content should be presented, when the augmented content should be presented, and how the augmented content should be presented. The data graphs can include a personal data graph that is unique to the user and that contains information about the user, a search data graph containing the user's interaction with a search engine, personal digital assistant, or other such systems, a combined user data graph that contains data from other users that are similar to the user (e.g., a "like me" data graph), and a company user data graph comprising information about a user's corporate identity, interactions, and so forth.

In addition to the above data graphs, an emotional intelligence (EI) platform may monitor a user's interactions and derive an EI graph containing the user's emotional state. The emotional state of the user can help the system ascertain things like how open the user is to the presentation of augmented content, how open the user would be help with their workflow, and so forth. The emotional state of the user can be used to help select the content to be presented, help select how the augmented content is presented and help select when to present the augmented content (i.e., the presentation timing).

As yet an additional data graph, a sensory graph can be monitored that includes the sensory input and/or response of the user. Thus, the sensory graph can identify things like temperature, ambient noise level, current tasks the user is involved in, what the user currently sees, and any other sensory information related to the user. The sensory system can receive real-time or near real-time input as to what the user is experiencing at that moment and update the sensory graph appropriately. The sensory graph can also be used to help select the content to be presented, help select how the augmented content is presented and help select when to present the augmented content (i.e., the presentation timing).

All the information in the various data graphs, singly or in any combination, will be referred to as context information upon which actions of the system are based.

Based on the various data graphs, the system decides what augmented content should be presented, when the augmented content should be presented, and how the augmented content should be presented. The augmented content to be presented can be any content that can be presented in the AR/VR environment. This can include text, audio, video, component models, and so forth.

To decide what content to present, the system monitors the user's workflow and the data graphs illustrated above. If the user's emotional state is such that the user would not welcome the presentation of augmented content, the system refrains from presenting any augmented content. Based on the context (i.e., the information in one or more of the data graphs above), the system identifies registered bots that would be appropriate for the context and calculates a score for each potential bot. Based on the scores, the system selects one or more bots using a selection criteria.

The selected bot(s) are then invoked to identify content that they suggest should be presented to the user based on the context. The system can then score the content to identify which of the content should be presented. In some instances, the output of multiple bots can be combined to produce the augmented content that will be presented. Scoring can be based on any of context information and/or combinations thereof such as the user's emotional state, the information in the sensory graph, information based on past user interests (i.e., search graph), and so forth.

The system then decides where to place the augmented content in the AR/VR environment. The locations where the augmented content can be presented depend, in some measure, on what form of the augmented content. For example, if the augmented content is an object to be placed within the AR/VR environment, suitable locations for presentations may be different than if the augmented content consisted of text information. Thus, the locations where the augmented content can be presented are identified. The system can select one or more locations based on a selection policy, such as a location score calculated based on factors that bias presentation to more desirable locations. The system presents augmented content in the periphery of the user's field of view. For purposes of this disclosure, periphery is outside the central gaze of the user but still within the field of view of the user. Thus, periphery lies outside the foveal region. In some embodiments, periphery includes the near periphery region. In other embodiments, periphery lies outside the near periphery region. Unless specified otherwise, periphery includes the near periphery region.

The system also selects a rendering fidelity for the augmented content. This rendering fidelity includes such characteristics as transparency, color, resolution, how much of the content is rendered, and so forth. Additionally, or alternatively, the augmented content can be reduced to its essentials in its initial rendering fidelity. For example, if the augmented content is an object, the initial rendering fidelity may present the augmented content as an outline, as a mostly transparent object, and so forth. If the augmented content comprises text, the text can appear in outline form, in a reduced version (i.e., where only the most important terms in the text are presented, where a summary or highlight of the text is presented, and so forth). Similar reduced fidelity for other content types can be used.

The notion is to initially render the content in both a location and in a manner that allows the user to notice the augmented content, but that will not distract the user. Thus, the initial rendering location is in the user's periphery and the initial rendering fidelity can be selected in order to allow the user to determine that the augmented content exists (i.e., to notice the augmented content) and the basics of what the augmented content is, but not necessarily the details of the augmented content and/or demand the attention of the user. The rendering fidelity includes one or more characteristics such as color, transparency, rendering resolution, how much of the augmented content is initially presented, and so forth are used to present the content so that it is noticed, but not demand the attention of the user.

The augmented content is passed to a rendering service to be presented at the chosen location(s) at the chosen rendering fidelity. As the system detects user interest in the augmented content, the rendering fidelity of the augmented content is increased. Thus, the rendering fidelity is proportional to the user interest in the content. When the user is focused on the content, the content is rendered at a high level of fidelity.

If a user ignores the augmented content (i.e., by turning attention away from the augmented content or by not expressing interest in the content), the system can proportionally reduce the rendering fidelity until the augmented content is removed from the AR/VR environment. For example, if the user moves through the AR/VR environment in such a way that the augmented content is mostly or completely out of the user's field of view, the augmented content can be removed. If the user subsequently returns to a point in the AR/VR environment where the augmented content would be in the user's field of view, the augmented content can be returned to the AR/VR environment in location and at a rendering fidelity that is appropriate for the interest expressed in the augmented content.

Description

The initial set of figures is designed to give an overview explanation of how the system operates and a representative example of some of the functionality it can provide. The scenario illustrated and discussed revolves around locating furniture suitable for a user to redecorate their apartment. However, numerous other scenarios could have been selected to illustrate basic functionality of the system.

FIG. 1 illustrates an example virtual reality or augmented reality environment 100 according to some aspects of the present disclosure. In this scenario, a user is getting ready to replace their furniture in their apartment. The user is using a AR/VR headset to help the user chose the pieces of furniture they want in their apartment. The user can do a search for couches or a third party, such as a decorator, can recommend pieces that the user should consider. The search engine and/or a bot associated with the decorator (depending on which data source is being used), provides a selection of couches, and the user selects a couch 102 and places it in the AR/VR environment of the apartment.

The user is then free to move the couch around the environment, changing its properties, such as color, length and so forth. If the user does not like the couch, the user can replace it with another model and again make changes. In addition, the user can change other aspects of the environment, such as wall coverings, lighting fixtures, floor coverings and so forth.

The system watches the user interactions, monitors various data graphs. As representative examples, the system can monitor one or more of a personal data graph, a search data graph, a combined user graph, a company data graph, an EI data graph and/or a sensory data graph. Examples of the data contained in these graphs can be summarized as indicated below:

Personal data graph: contains user information such as profile data, personal preferences, demographic data, and so forth;

Search data graph: contains a user's search history and/or interaction history (such as with a search system or a personal digital assistant);

Combined user graph: contains user information for other users that are similar to the user (i.e., a "like me" data graph);

Company data graph: contains user information related to their work such as job title, job responsibilities, and other such information;

EI data graph: contains an emotional state of the user and/or emotional insights into the user; and/or Sensory data graph: contains sensory data being experienced by the user such as temperature, ambient noise level, lighting, and so forth.

Based on monitoring the user's activities, and the data graphs, the system selects one or more bot(s) that can provide augmented content that may be useful to the user. For example, the system can identify that the user has been engaged with the style of couch 102 and that one or more bots can suggest complementary chairs.

Figure 2:
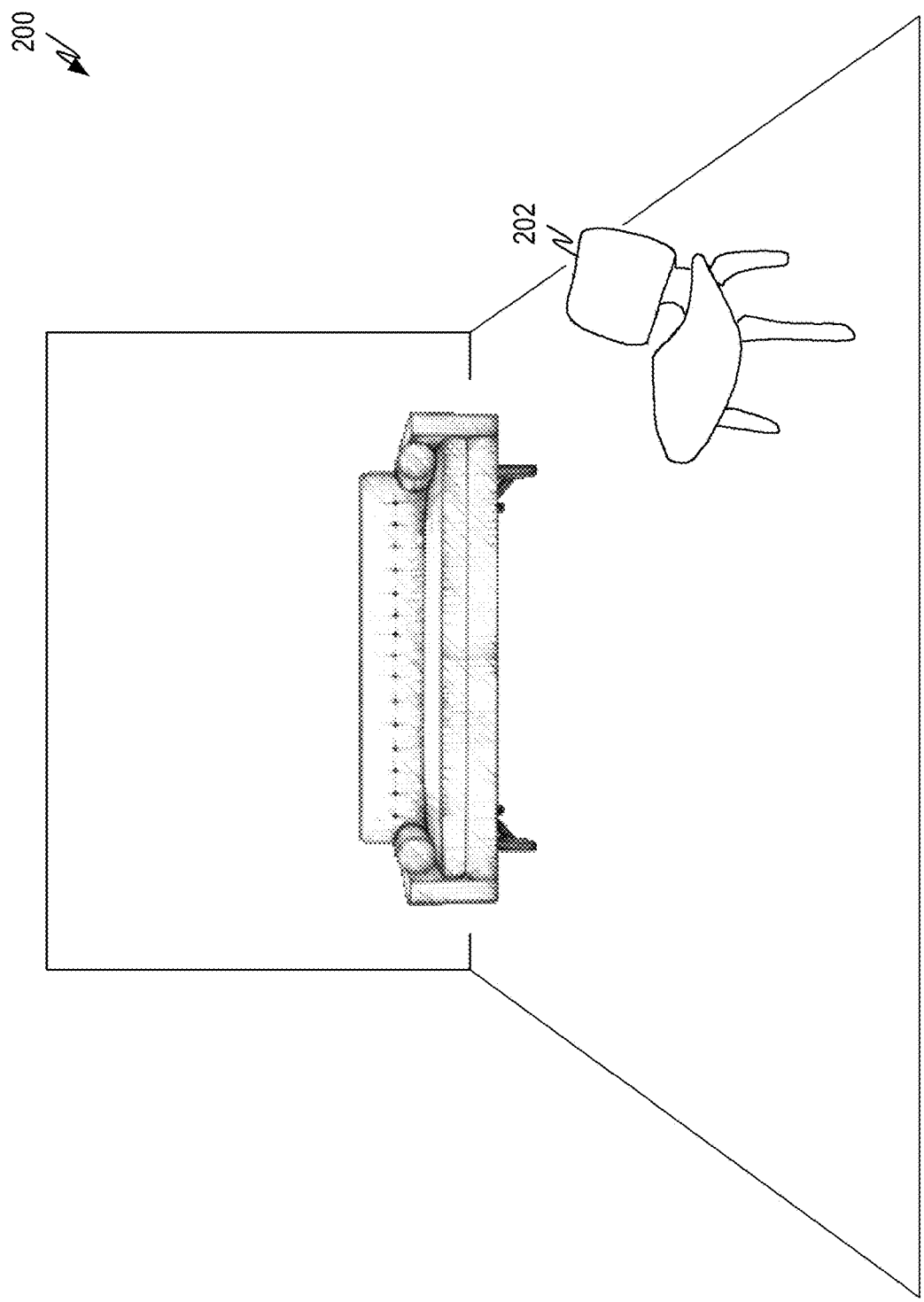
FIG. 2 illustrates an example virtual reality or augmented reality environment according to some aspects of the present disclosure.

In FIG. 2, the system selects one or more bots which suggest a complementary Eames chair. The system identifies a location that is within the user's periphery and selects a rendering fidelity that will allow the user to notice the augmented content, but that will not distract the user from their current task of manipulating the couch 102. In this example, the augmented content (i.e., Eames chair) is presented in outline form 202 (e.g., a low rendering fidelity) and the chair 202 is introduced into the AR/VR environment 200 at a location that is within the user's periphery. The system continues to monitor the user's activities and interest.

Figure 3:
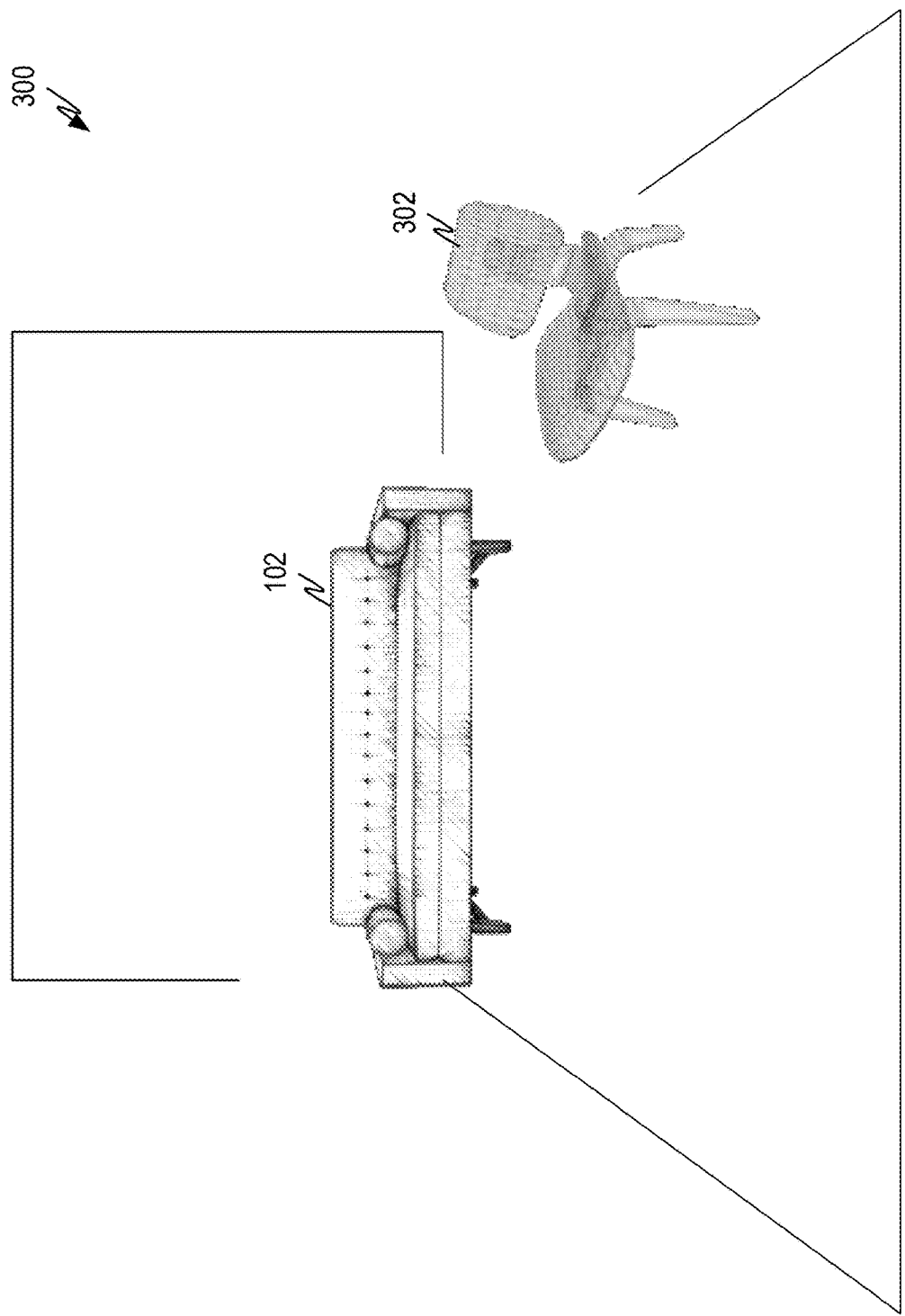
FIG. 3 illustrates an example virtual reality or augmented reality environment according to some aspects of the present disclosure.

As the user beings to focus on the chair 202 or otherwise expresses interest, such as by turning their attention or gaze to the chair 202, the rendering fidelity of the chair 302 increases as illustrated in FIG. 3.

The user can express interest by moving their gaze to the chair 302, by moving closer to the chair 302 (bringing it into closer proximity), by initiating an activity/action with the chair 302, and in other ways. In FIG. 3, the rendered fidelity of the chair 302 increases with increasing user interest. Thus, the chair may be rendered as more than an outline (but less than a complete model), by changing color, and in other ways as discussed herein.

Figure 4:
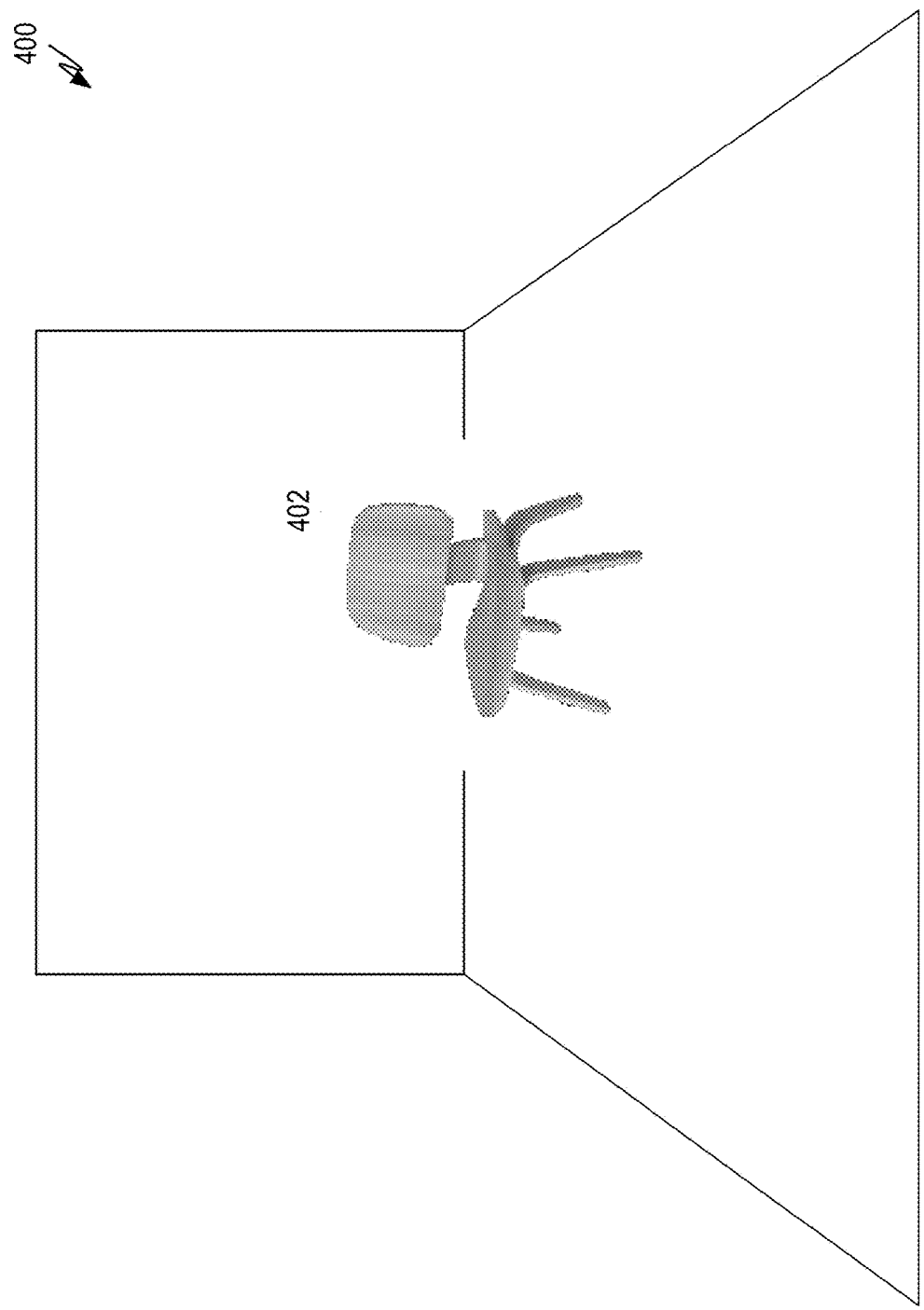
FIG. 4 illustrates an example virtual reality or augmented reality environment according to some aspects of the present disclosure.

As the user continues to express interest, the rendering fidelity of the chair increases until, as shown in FIG. 4, the chair 402 gains a high level of fidelity. At this point the user can perform actions with the chair such as repositioning the chair within the AR/VR environment, saving the chair for later consideration (e.g., add to "favorites"), changing its properties, ordering the chair for purchase, and so forth.

If the user had ignored the chair 202 as originally presented in FIG. 2 or if the user had otherwise moved thorough the AR/VR environment would in way that put the chair 202 out of the user's field of view, the fidelity could be reduced (e.g., over time) until the chair was removed from the AR/VR environment 200. If the user then returns to a point in the AR/VR environment where the chair 202 would be visible again, the system can represent the chair 202 in the periphery of the user at the same (or a similar) location as before so the user can have the opportunity to express interest again.

FIGS. 1-4 give a representative overview of how the system works and how the system can present information to the user (or to multiple users if they are engaged in the same AR/VR environment). It does not illustrate all options and variations that are implemented in different embodiments. Similarly, they do not present essential or required functionality that must exist in all claimed embodiments.

Figure 5:
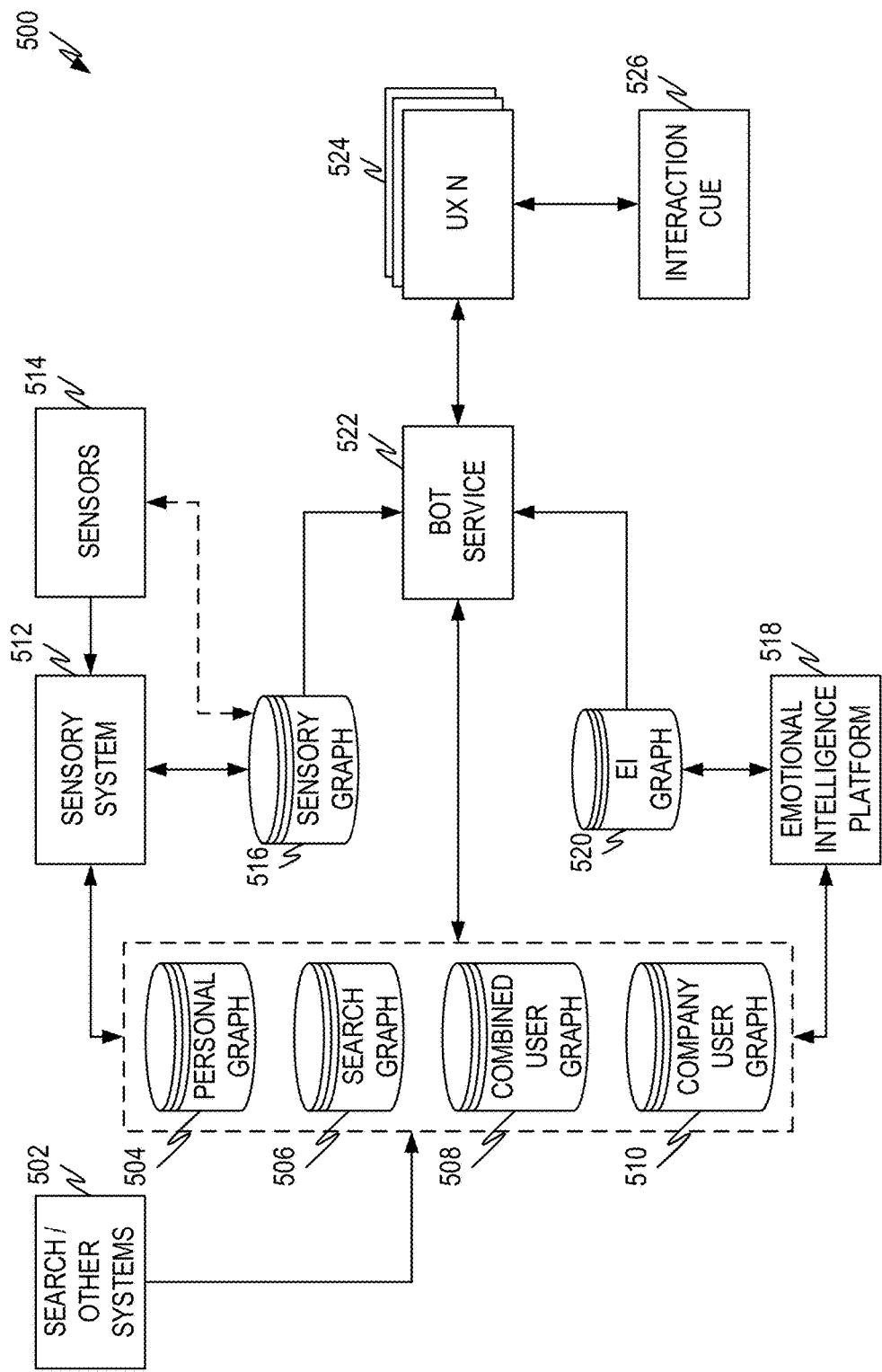
FIG. 5 illustrates a representative bot architecture according to some aspects of the present disclosure.

FIG. 5 illustrates a representative bot architecture 500 according to some aspects of the present disclosure. This architecture 500 can be used to implement the various functionality of different embodiments as explained herein. Bots provide content and/or functionality that can be at least part of the augmented content and that allows a user to interact with the content in ways that are not necessarily native to the system itself. Thus, bots not only provide content to the system, they can be used to extend and/or customize the functionality of the system.

Bots are associated with a particular domain. In this context a domain can be either a particular provider (such as an internet domain associated with search results) or can be a category (such as airline travel, calendar, communication, weather, and so forth) or both. Domains help identify relevant bots as explained in greater detail below. Bots can be developed by a particular data provider and integrated into the system as discussed below.

In summary, a bot provides data and/or functionality within a particular domain. A bot can be provided by a particular data provider and can help the data provider integrate their data, products, services, and so forth into the system in a way that allows users to discover and interact with augmented content provided by the bot or based upon data provided by the bot. Alternatively, as discussed below, the bot can be a bot provided by the system itself and/or a broker bot that integrates responses from multiple bots and presents the integrated response to the user via the broker bot.

As illustrated in FIGS. 1-4, the system monitors a user's interactions with other systems, such as a search system, a digital assistant, productivity applications, and so forth 502 and, based on those interactions decides what augmented content should be injected into the AR/VR environment (if any) and how it should be injected and when it should be injected. As a user interacts with the various systems 502, the systems can update various data graphs that represent the state of a user's interaction as well as past history and other relevant data. Thus, the systems 502 can keep this information in a personal data graph 504, a search data graph 506, a combined user data graph 508, and/or a company user data graph 510. In other embodiments, other data graphs may be monitored/analyzed in addition to or in lieu of one or more of the representative data graphs 504, 506, 508, 510. Representative contents of these various graphs have been discussed above.

In addition to the current state of a user's interaction, past history and other relevant data, the system can monitor the user's emotional state and what the user is currently experiencing. The emotional state of the user can be derived by an emotional intelligence platform 518. The emotional state of the user can be derived in a variety of ways. For example, U.S. application Ser. No. 15/291,305 entitled "Extracting an Emotional State from Device Data" (incorporated by reference herein in its entirety) describes a suitable platform (i.e., emotional intelligence platform 518) for extracting the emotional state of the user. As described therein, the emotional state of the user can comprise an emotional state graph and/or emotional insights, either of which or both can be part of emotional intelligence graph 520.

The system can thus monitor emotional intelligence graph 520 for the current emotional state of the user and emotional insights that help the system interpret how the emotional state of the user should impact operation of the system. For example, when the user is frustrated the emotional insights can help the system understand that augmented content will not likely be well received by the user and the system can thus refrain from presenting augmented content when the user is frustrated. Additionally, or alternatively, the emotional insights can help the system understand that the source of the user's frustration seems to be the inability to accomplish a task. If the system can identify augmented content (i.e., produced by a bot as described herein) that can help the user accomplish the task, then the system can decide to present the augmented content to help alleviate the source of the user's frustration. Thus, the emotional state and/or emotional insights of the user can help the system determine whether to present content and/or which content to present.

Sensors 514 can also collect sensory, environmental, and other data about the user and/or the user's environment. For example, sensors 514 can collect information such as ambient temperature, kinesthetic information about the user, lighting levels, ambient noise level, environmental sounds and/or content (e.g., that music is playing, what music is being played, whether someone else is talking to the user, what is being said, and so forth), and other sensory information being experienced by the user.

The sensor data from sensors 514 can be processed by a sensory system 512 to produce a sensory graph 516 which contains information about what the user is experiencing from a sensory perspective. This can help the system identify whether to present content, what content to present, how the content should be presented, and so forth. For example if the ambient noise level is large, presenting audio information to the user would not likely be received well. Even if the user can hear the audio information over the ambient noise level, the user may be distracted and not understand the audio information.

As described in application Ser. No. 15/291,305 much and/or all of the sensory data produced by sensors 514 is also used by the emotional intelligence platform 518 to derive the user's emotional state and/or emotional insights. If this is the case, it may be that emotional intelligence platform 518 can also provide the sensory data to the sensory data graph 516 and/or provide the information in the sensory data graph 516 as part of the emotional intelligence data graph 520 without the need for a separate data graph. In either case, the system has access to the sensory data being experienced by the user and can make decisions based on the sensory data.

A bot service 522 can monitor user interactions either directly or through analysis of the information in one or more data graphs (e.g., 504, 506, 508, 510, 516, 520) and identify which bots may have relevant augmented content that would be of interest to the user. The monitoring of the data graphs allows the bot service 522 to identify what actions the user is engaged in, the emotional state of the user, what the user is experiencing, the user's past history and so forth as described herein. Based on this information, the bot service 522 decides whether to present content, which bots have content of interest, which content should be presented, and if content should be presented, when and how the content should be presented.

In order to decide whether augmented content should be presented, the bot service 522 can evaluate the emotional intelligence graph 520 to ascertain whether the user would be receptive to augmented content. This is performed by ascertaining the emotional state of the user and, using the emotional insights for the user, identifying whether that emotional state translates into a receptiveness or non-receptiveness to have the augmented content placed in the AR/VR environment. As one representative example, when the user is experiencing negative emotions such as anger or frustration, some embodiments of the system will not present augmented content unless augmented content can be identified that will help alleviate the source of the negative emotion (e.g., inability to perform a task, access desired information, and so forth). As another representative example, in some embodiments, when the user's emotional state indicates the user could use help, augmented content that is likely to help the user will be presented. As another example, in some embodiments, when the user's emotional state is anything other than negative, augmented content will be presented. As a further example, in some embodiments the emotional state is not used in determining whether to send augmented content to the user.

When the bot service 522 determines to present content, the bot service 522 can identify bots that belong to a domain relevant to a user's activities. Discovery of relevant bots is discussed below in conjunction with FIGS. 6 and 8 in greater detail. However, in summary, the bot service 522 identifies relevant domains and locates the bots associated with that domain. Additionally, or alternatively, a bot registry can be established so that bots can register so the bot service can locate them and their associated domains.

Once the relevant bots are identified, the bot service 522 selects one or more bots, such as based on a score, and selects augmented content from one or more bot to be presented in the AR/VR environment as discussed below. Augmented content is placed into the AR/VR environment in a location and in a manner that allows the user to notice the augmented content without distracting the user from their current workflow. As explained herein, the location chosen will be in the periphery of the user's field of view. As discussed previously, periphery is outside the central gaze of the user but still within the field of view of the user. Thus, periphery lies outside the foveal region. In some embodiments, periphery includes the near periphery region. In other embodiments, periphery lies outside the near periphery region. Unless specified otherwise, periphery includes the near periphery region.

In addition to selecting a location, the bot service 522 also selects a rendering fidelity for the augmented content. This rendering fidelity includes such characteristics as transparency, color, resolution, how much of the content is rendered, and so forth. The location and rendering fidelity selected are what allow the augmented content to be presented in a manner that the use will notice without distracting the user from the user's primary workflow. Placing the augmented content in the user's periphery at a lower rendering fidelity allows the content to be noticed without distracting the user. Rendering fidelity is discussed in greater detail below.

Once the bot service 522 determines that augmented content should be presented and determines how the content should be presented (i.e., determines the rendering fidelity), at the appropriate time, the bot service 522 sends the information to one or more rendering services 524. The rendering services can be 2-D or 3-D rendering services and can be used to render content in a variety of ways as explained herein. In the examples presented herein, a 3-D rendering service is used as a representative example. However, the principles apply to 2-D rendering services as well. The rendering service 524 receives the augmented content that should be rendered along with information that describes where and/or how the content should be rendered.

The system will monitor the user's interest in the augmented content as indicated by the interaction cues process 526. The rendering fidelity is adjusted based on the user interest so that as a user expresses interest, rendering fidelity is adjusted upward (i.e., higher rendering fidelity) and as a user does not express interest, rendering fidelity is adjusted downward (i.e., lower rendering fidelity). Adjusting rendering fidelity is discussed below.

Figure 6:
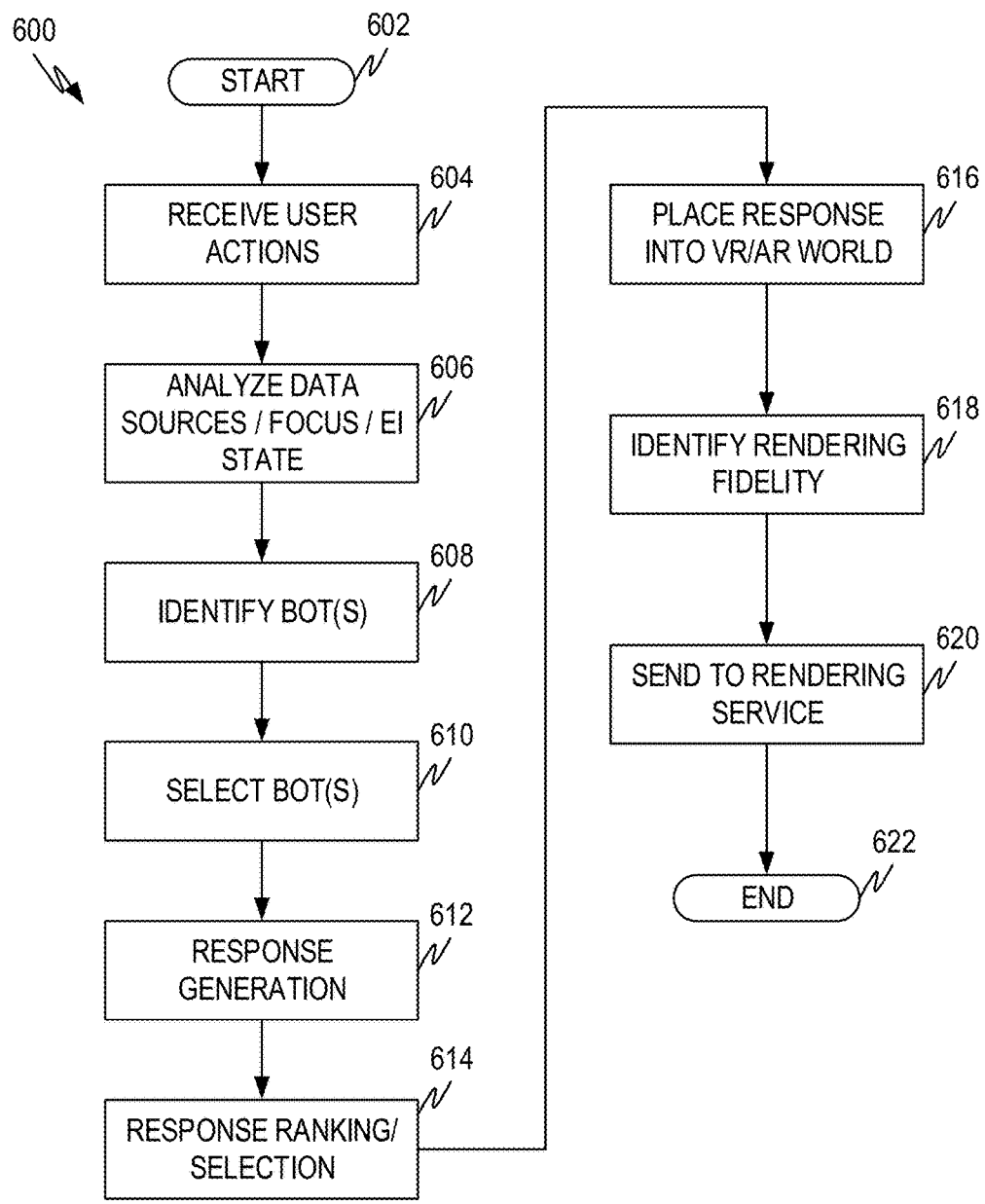
FIG. 6 illustrates a flow diagram for identifying bots and placing content into a virtual or augmented world according to some aspects of the current disclosure.

FIG. 6 illustrates a flow diagram 600 for identifying bots and placing content into a virtual or augmented world according to some aspects of the current disclosure. This flow diagram explains certain operational aspects of the architecture in FIG. 5 in greater detail and can be implemented by the bot service 522.

The diagram begins at operation 602 and proceeds to operation 604 where the user's actions are examined. As explained above, the system can monitor the user and what the user is doing by monitoring various data graphs (e.g., 504, 506, 508, 510, 516, 520, and/or other data graphs). These can provide real time or near real time (depending on the processing time to place information into the data graphs) contextual information for the user and the user's actions. It is this overall contextual information that drives the operation of the bot service and allows the bot service to make determinations such as should augmented information be presented to the user, what augmented information should be presented to the user, how should the augmented information be presented to the user and when should the augmented information be presented to the user.

Operation 606 analyses one or more of the data graphs to create the contextual information that drives the operation of the bot service 522. The contextual information can comprise one or more of:

activity/activities of the user (e.g., the workflow of the user);
emotional state of the user and emotional insights corresponding to the emotional state of the user;
sensory information of the user;
user profile information;
search/digital assistant history information;
"like me" user information;
user company information; and
other information.

Figure 8:
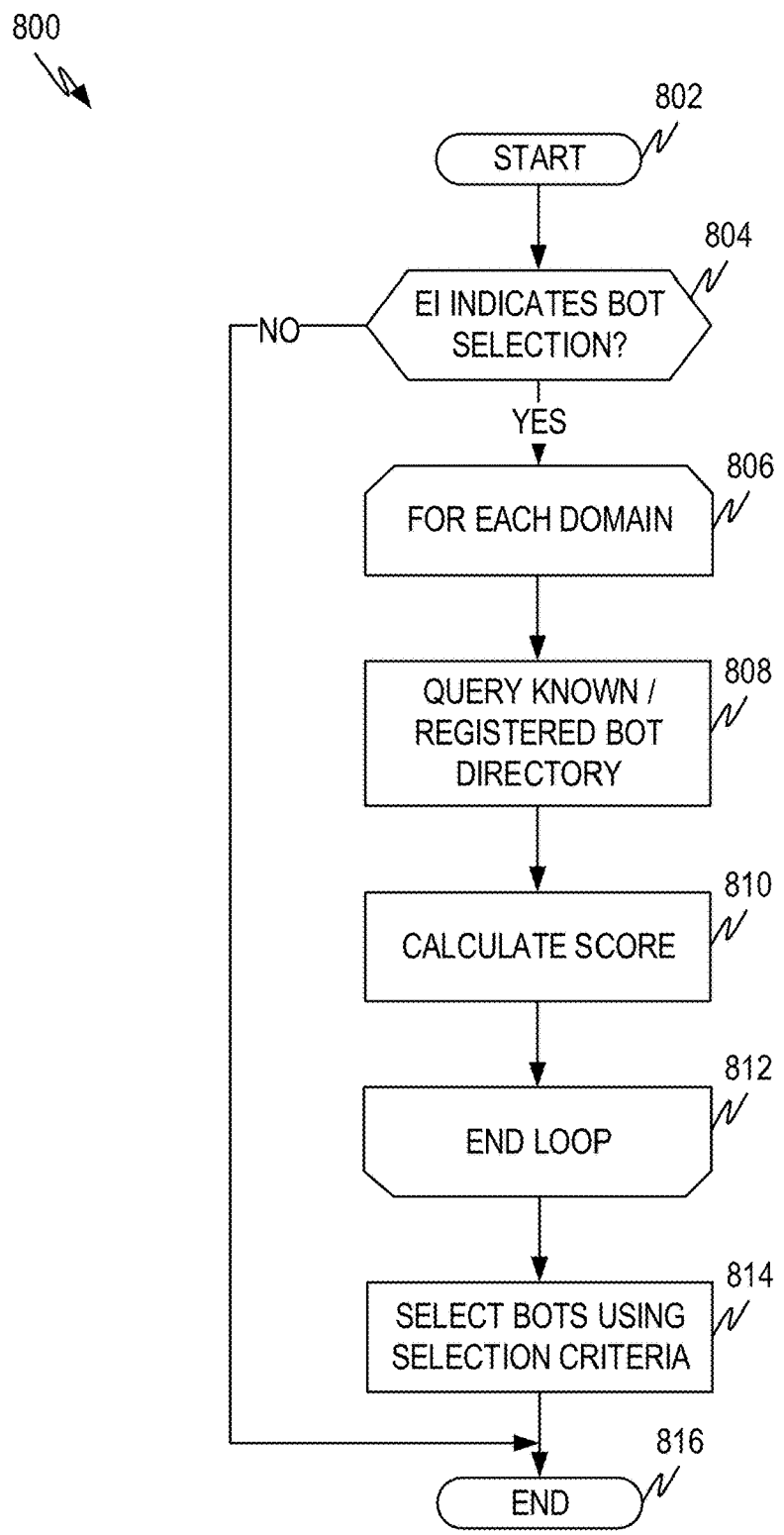
FIG. 8 illustrates a flow diagram for selecting bots according to some aspects of the present disclosure.

If the user emotional state and/or insights indicates the user would not be receptive to augmented content, in some embodiments, the flow diagram ends and waits until the user's emotional state and/or insights indicate that the user would be receptive to augmented content. If the user would be receptive (or not non-receptive) to augmented content, the method proceeds to operation 608 and 610 where relevant bots are identified and appropriate bots are selected. One or more bots can be selected by operations 608 and 610. FIG. 8 explains operations 608 and 610 in greater detail.

Once the appropriate bot(s) are selected, operation 612 presents some or all of the contextual information and receives responses from the selected bot(s). In this context, a response from a bot can comprise augmented content as well as other information.

As one example, in the scenario described in FIGS. 1-4, the user may perform a search for couches the user likes. Once a couch has been found, the system can take the couch and submit the couch to the search service to see what other items may match the couch. In the resultant search results, the system may identify one or more providers that have associated bots (i.e., operations 608 and 610). The bots can then use the search string, the user activities (i.e., considering and/or manipulating a couch), and other contextual information (user preferences, and so forth), to identify the chair.

As another example, in the scenario described in the summary, where the user is struggling with finding the proper combination of components to meet certain design requirements, the system may submit the requirements to a search engine and receive search results that offer components that may meet the user's needs. The search results can have bots which are identified (operations 608 and 610) that can take the input search string, component requirements, and/or other information and produce recommended components as well as other information.

If multiple bots are selected, the various responses from the multiple bots may need to be ranked to limit the number of responses to a manageable number. This is represented by operation 614. Response selection is described in greater detail in FIG. 9.

Operation 616 selects where the augmented content should be placed. As noted above, the augmented content will be placed in the periphery of the user. Location selection is discussed in greater detail in FIG. 10.

Operation 618 selects the rendering fidelity for the augmented content. As described herein, the combination of rendering location and rendering fidelity help the system place the augmented content into the AR/VR environment in a way that allows the user to know that augmented content exits but does not distract a user from the primary workflow (i.e., what the user is doing at the time when the augmented content is placed into the AR/VR environment). Thus in some embodiments, the selection of location and rendering fidelity is interdependent. In other embodiments, the selection of location is separate from the selectin of rendering fidelity.

Rendering fidelity includes one or more characteristics such as transparency, color, resolution, how much of the content is rendered, size, and so forth. The combination of these characteristics, along with placing the augmented content in the periphery of the user, allows the augmented content to be noticed without distracting the user. For example, in the scenario described in FIGS. 1-4, the initial presentation of the chair 202 comprised an outline of the chair. Thus, the initial rendering resolution was considerably less than the full fidelity rendering of the chair 402. Similarly, the resolution of the chair 302 was presented in wireframe, which has more resolution than the outline chair 202 but less than the fully rendered chair 402. Thus, resolution can comprise the number of polygons used to render the object in the AR/VR environment, the texture of the object, and so forth. The resolution thus adjusts how "real" something appears in the AR/VR environment.

Additionally, or alternatively, the color of the presented chair could be adjusted so that it is distinguishable from the background but not a color that it immediately draws the user's eye to the content. Stated another way, color can be used to help the content blend into the background but be distinguishable from the background. Transparency is another characteristic that can be used to make the object seem present to a greater or lesser degree in the AR/VR environment. The more transparent an object is, the less present in the AR/VR environment a user perceives it to be.

Additionally, or alternatively, the amount of information that is presented in the AR/VR environment can be adjusted so that initially less information is presented and as a user expresses more interest, more information is presented. For example, if the augmented information is text information, initially only a few words or a summary can be presented and as the user expresses more interest, more of the text can be presented. In another example, if the augmented content is an object, the object can be simplified so that the whole object is not presented. Additionally, or alternatively, one object can be substituted for the augmented content. For example, rather than present the outline of the chair, a placeholder object can be presented, that lets the user know that augmented content is available and as the user focuses on the placeholder object, the augmented content is presented, at a selected rendering fidelity. In a placeholder object one type of information can stand in for another. For example, text may be rendered on a surface and as the user focuses on the text, the text can be replaced with an object in the AR/VR environment.

Additionally, or alternatively, the size of the object can be adjusted so that it is smaller when first presented and becomes larger as the user expresses more interest.

Selecting a rendering fidelity thus comprises selecting one or more characteristics such as transparency, color, resolution, how much of the content is rendered, size, and so forth that will be used to render the object. Which combination can be based on user preference, for example, the user may specify that they prefer resolution adjustment for initial presentation of augmented content or that they prefer transparency adjustment for initial presentation of augmented content. Which combination is selected can also be based on the activities of the user. For example, when the user is manipulating objects within the AR/VR environment such as the couch of the scenario in FIGS. 1-4, the object is presented in reduced resolution, while if the user is walking or moving through an AR/VR environment, the augmented content is presented in higher resolution but at a reduced size.

Similarly, which combination is used can also be based on the content of the AR/VR environment. If the AR/VR environment allows the object to be presented, it can be presented at full size but at a reduced resolution. However, if there would be no room in the AR/VR environment to present the object, a placeholder object is presented in conjunction with the existing environment and as the user expresses interest, the placeholder object can be replaced with the augmented content. For example, if the AR/VR environment of FIGS. 1-4 shows all the furniture in the user's apartment, there may be no place for the chair 202 to be shown. Thus a placeholder object can be rendered in its place. For example, the placeholder object can be a highlight, color shift, resolution change or some other characteristic change of an existing object within the AR/VR environment.

For example, suppose in the scenario of FIGS. 1-4, all the furniture of the user's apartment is presented. As part of exploring the user's options, the user places the couch 102 within the AR/VR environment, removing the existing couch. However, all the remaining furniture remains. As the system is suggesting a chair, the system can change the fidelity of an existing chair to indicate to the user that augmented content can be had for the existing chair. As the user expresses interest in the placeholder object (i.e., the existing chair that has the rendering fidelity changed), the placeholder object is removed and the augmented content is presented at an appropriate level of fidelity for the user interest expressed.

After the rendering fidelity is selected, the location, augmented content, rendering fidelity and/or other information is sent to the rendering service in operation 620 for display to the user.

Figure 7:
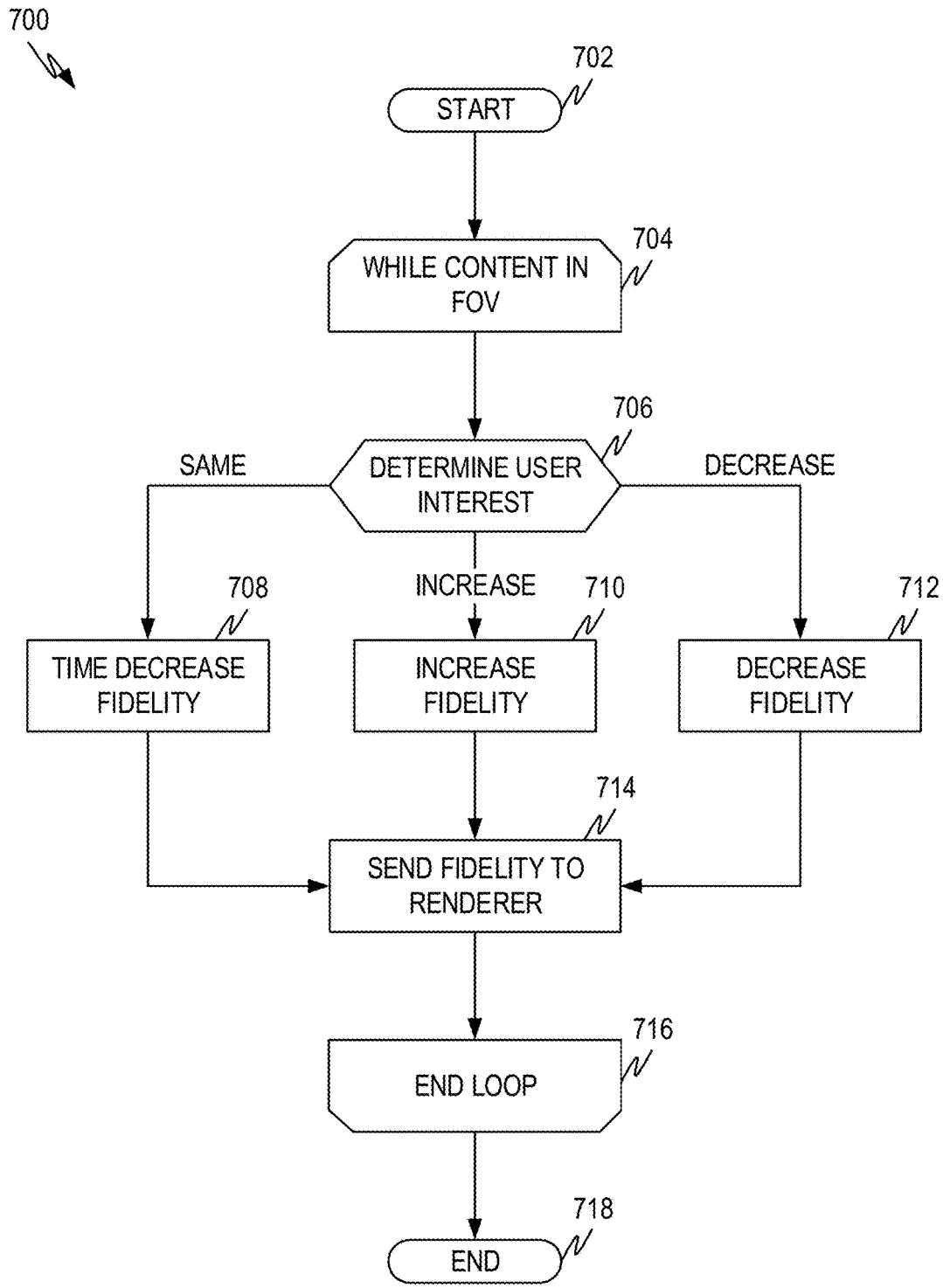
FIG. 7 illustrates a flow diagram for adjusting rendering fidelity according to some aspects of the current disclosure.

As discussed herein, the system adjusts the rendering fidelity based on the interest expressed by a user in the augmented content. FIG. 7 illustrates a flow diagram 700 for adjusting rendering fidelity according to some aspects of the current disclosure. The flow diagram would be implemented by the bot service 522 or another component of the system, for example, once augmented content had been presented to the user.

The flow diagram begins at operation 702 and proceeds to operation 704, which provides a loop that adjusts the fidelity according to the interest paid to the augmented content. In the representative example of FIG. 7, the loop is performed as long as the augmented content is within the user's field of view. If the user moves away from the augmented content, such as by moving through the AR/VR environment in a way that makes the AR/VR content unseen by the user, the rendering fidelity of the augmented content can be treated in different ways depending on the implementation. The different ways that the augmented content can be treated in different embodiments, can be summarized by what happens during one or more time periods after the augmented content passes from the user's field of view. For example, the following are representative of some of the different embodiments:

The rendering fidelity of the augmented content remains fixed (i.e., unadjusted) during a period of time. After the period of time the augmented content is removed from the AR/VR environment.

The rendering fidelity of the augmented content slowly degrades over a period of time until a threshold is reached and the augmented content is removed from the AR/VR environment.

The rendering fidelity of the augmented content remains fixed during a first period of time. After the period of time, the rendering fidelity of the augmented content slowly degrades over a second period of time until a threshold is reached after which the augmented content is removed from the AR/VR environment.

These implementations allow the user time to return the augmented content to their field of view and have the augmented content still available for the user to express interest in and explore. Thus, in the example of FIGS. 1-4, the user may turn away from the chair 202 for a while to work with another part of the room and when the user turns back so the chair 202 is within the user's field of view, the chair 202 will still be there, perhaps with its rendering fidelity adjusted downward, depending on the embodiment as explained above.

Returning now to FIG. 7, operation 706 determines the user's interest in the augmented content and identifies whether it is has increased, decreased or remained the same. Determining user interest in augmented content can be measured by a number of indicators. For example, if a user focuses their gaze on the augmented content, the user has expressed increased interest (from a state of not focusing their gaze on the augmented content). Similarly, moving to a closer proximity can indicate increased interest. Manipulating the augmented content through the AR/VR system can indicate increased interest. Length of dwell time (i.e., how long the user looks at, works with, and so forth) on the augmented content can also indicate increased interest where longer dwell time indicates more interest and shorter dwell time indicates less interest. Decreased interest can be indicated by the opposite of the increase interest indicators above.

If operation 706 indicates decreased interest in the object, execution passes to operation 712 and the rendering fidelity is decreased. The rendering fidelity is then sent to the rendering service in operation 714 and the loop ends at operation 716.

If operation 706 indicates increased interest in the object, execution passes to operation 710 and the rendering fidelity of the augmented content is increased. The rendering fidelity is then sent to the rendering service in operation 714 and the loop ends at operation 716.

If operation 706 indicates no change in interest, what happens can depend on the embodiment. In one embodiment, the rendering fidelity is decreased over time as indicated in operation 708. Once the rendering fidelity reaches a threshold, the augmented content can be removed. In another embodiment, the rendering fidelity remains fixed. In still another embodiment, the rendering fidelity remains fixed for a first period of time and then begins to decrease over a second period of time until a threshold is reached and the augmented content is removed. In any embodiment, once the rendering fidelity is determined, the rendering fidelity is sent to the rendering service in operation 714 and the loop ends at operation 716.

One or more of the decision paths out of operation 706 can have a time delay (or no time delay) built into them before the rendering fidelity is adjusted by operations 708, 710, or 712. The time delays for each path can be different. For example, in one embodiment, if the user interest decreases, the rendering fidelity will not decrease in operation 712 until a first time period expires. The same embodiment may have no time delay on increasing the rendering fidelity in operation 710. The same embodiment may have a different time delay before reducing the rendering fidelity in operation 708. Thus, all combinations of time delay and no time delay are disclosed and differing time delays for those paths that have time delays are also disclosed.

Increasing and/or decreasing the rendering fidelity can be accomplished in several different ways. Any mapping that maps a level of interest to a rendering fidelity can be used. For example, level of interest can be calculated from an aggregation of user behaviors. As a representative example only:

$$U_i = D_u + G_u + A_u$$

Where: $U_i$ is the resulting user interest metric;

$D_u$ is a normalized distance between the user and the augmented content;

$G_u$ is a gaze metric proportional to how close the augmented content is to the center of the user's gaze; and $A_u$ is a binary value that indicates whether the user is performing an action with the augmented content.

The normalized distance metric, $D_u$, can be calculated by selecting a maximum and minimum value based on the AR/VR environment dimensions and then normalizing how far the user is from the augmented content to map the minimum value to 1 and the maximum value to 0.

The gaze metric, $G_u$, can be calculated by determining where the user's gaze is and measuring the angle between the user's gaze and the augmented content. The resultant angle can be normalized so that if the content is in the center of the user's gaze, the value of $G_u$ is 1 and if it is out of the user's field of view, the value is 0.

The action metric, $A_u$, can be set to 1 of the user is performing an action and 0 if the user is not.

The resultant user interest metric, $U_i$ will lie between 0 and 3, inclusive. This can further be normalized to the [0,1] interval if desired.

The user interest metric, $U_i$ can then be used as an indicator of a scale between the minimum rendering fidelity and maximum rendering fidelity. For example, if the minimum fidelity is an outline (and no polygons for the surface) and the maximum fidelity is a realistic representation (maximum polygons and texture), the $U_i$ can be used to calculate a proportional number of polygons to render the surfaces of an object and/or an amount of texture to apply to surfaces of an object.

Additionally, or alternatively, the rendering fidelity can be described in steps (i.e., n discrete object representations) with the minimum fidelity on one end and the maximum fidelity on the other. $U_i$ can then be used to determine which of the n representations are selected for rendering, based on distributing the n representations across the interval [0,1] (or whatever interval $U_i$ represents.

These are representative methods to map a user interest metric to a rendering fidelity and any mapping can be used if desired so long as the rendering fidelity is proportional to the user interest.

The flow diagram ends at operation 718.

FIG. 8 illustrates a flow diagram 800 for selecting bots according to some aspects of the present disclosure. The flow diagram 800 represents, for example, how 608, 610 can be performed.

The diagram begins at operation 802 and proceeds to operation 804. Operation 804 identifies whether augmented content should be presented based, for example, on the emotional state of the user, emotional insights for the user, sensory data, and so forth. Representative conditions where a user may be or may not be amenable to the presentation of augmented content have been discussed above. If the user is not amenable to having augmented content presented (the "NO" branch), the method can terminate at operation 816 and no content will be provided to the user.

If the user ins amenable to having augmented content presented (the "YES" branch), operation 806 begins a loop over domains relevant to the current context. As noted above, domains can be a provider (such as an internet domain associated with search results) or can be a category (such as airline travel, calendar, communication, weather, and so forth) or both. Thus, if the user has been searching, working with a digital assistant, or otherwise retrieving a set of search results, a subset of the search results can be evaluated to see if bots are associated with any of the subset. Additionally, or alternatively, a registry of bots (e.g., bot directory) can be searched and the bots associated with relevant domains extracted.

Operation 808 and 810 queries each of the bots and/or consults metadata about each bot in turn to identify whether the bot has relevant information to provide. Identifying whether a bot has relevant information to provide can be performed in several ways. In one representative example, metadata about the bot is consulted which describes the type of information the bot can provide. The type of information can be compared to context information to determine similarity between the type of information and the activities, interest, and so forth of the user. Additionally, or alternatively, context and/or query information can be given to the bot and the information returned by the bot compared to context information to determine similarity between the information and the activities, interest, and so forth of the user.

Any desired method can be used to determine similarity. For example, various machine learning techniques can take as an input words and create a vector space where word vectors are positioned in the vector space such that words that share common contexts in the corpus are located in close proximity to one another in the space. These machine learning techniques can be used to determine similarity of the information about or from the bot to the context by measuring the distance in the vector space between the two. Both supervised and unsupervised learning techniques have been applied to this class of problems and can be used.

The loop ends at operation 812.

Operation 814 uses the scores (e.g., similarity scores calculated as described above) to rank the relevance of the bots and/or the bot output and selects those bots with the most relevant information. In one example, all bots with a score above a certain threshold are selected. In another example, the top N bots are selected based on their similarity score. In yet another example, the top N bots that have scores above a threshold value are selected.

The method ends at operation 816.

Figure 9:
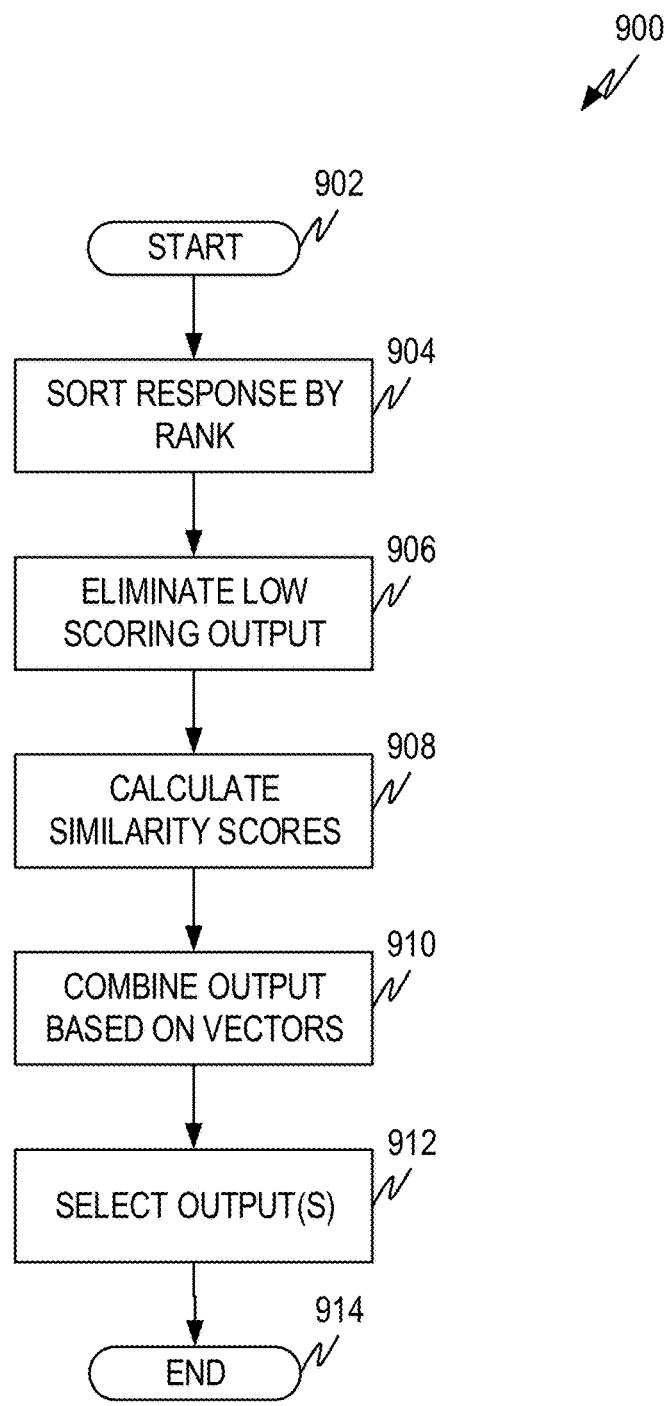
FIG. 9 illustrates a flow diagram for ranking and selecting bot output according to some aspects of the present disclosure.

FIG. 9 illustrates a flow diagram 900 for ranking and selecting bot output according to some aspects of the present disclosure. The diagram represents, for example, how operation 614 can be accomplished. When multiple bots are selected, the system has competing information to provide. Different embodiments of the system can handle the multiple bot situation in different ways. In one embodiment, the system can select multiple bots to provide multiple pieces of augmented content and present the multiple content as described herein. In another embodiment, the system can merge multiple bot content into a single piece of augmented content that can be presented as described herein. In yet another embodiment, the system can select one bot and/or bot content to present augmented content to the user. The diagram in FIG. 9 can be adapted to any of these scenarios by one of skill in the art, but using or not using various combinations of the described operations as discussed below.

The diagram begins with operation 902 and proceeds to operation 904. Operation 904 sorts the various responses by rank. The rank can be calculated, for example, using the similarity scores discussed in conjunction with FIG. 8 above. Once the bots identified in FIG. 8 are selected, their response can be ranked either by calculating a similarity score for the response or by using the rank of the bot as a proxy for the rank of the similarity score of the bot output. In other words, if bots A, B and C are selected from the process of FIG. 8, and the bots in rank order (e.g., similarity score order) are B, A, C, then the output of the bots can be ranked using the rank of the bot.

Operation 906 eliminates any low scoring output. To accomplish this, if the output already has scores, then any scores below a certain threshold can be eliminated. Additionally, or alternatively, output from the bottom k bots can be eliminated.

Any output (e.g., output that used a bot's rank/score as a proxy) that does not have similarity scores already calculated can have scores calculated in operation 908. Alternatively, operation 908 can be performed earlier in the flow so that operations 904 and/or 906 operate on similarity scores for bot output and not on proxy scores.

If the output for bots are going to be combined, operation 910 combines the output based on vectors (i.e., where the response lies in the vector space discussed above). For example, if the responses from two bots are very similar and have a large degree of overlap, the responses may be easily combined by merging the response vectors. This works well for textual output from bots, but may not work well for other types of output, such as AR/VR models to be rendered in the AR/VR environment. Thus, operation 910 may not necessarily be available for all types of bot output.

Operation 912 selects an appropriate number of responses to be presented as augmented content based on selection criteria and how many pieces of augmented content are to be presented. Thus if only one piece of augmented content is to be presented, the top scoring output can be selected. In other alternatives, the top K responses can be selected or the top K response having a score above a threshold can be selected, and so forth.

The method ends at operation 914.

Figure 10:
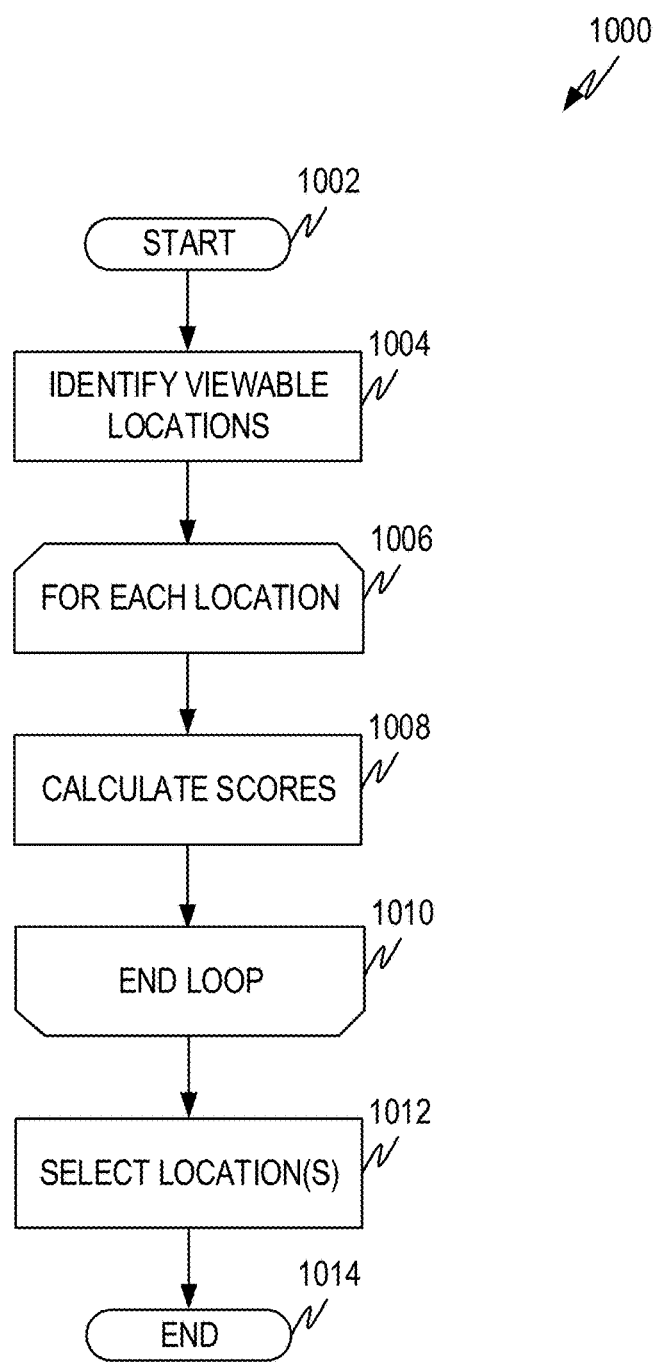
FIG. 10 illustrates a flow diagram for placing bot output into a virtual or augmented world according to some aspects of the present disclosure.

FIG. 10 illustrates a flow diagram 1000 for placing bot output into a virtual or augmented world according to some aspects of the present disclosure. This represents one way to implement operation 616, for example.

The method begins at operation 1002 and in operation 1004 identifies locations that are within the user's field of view. More specifically, the locations that are identified are within the periphery of the user. The periphery of the user is calculated using the near peripheral, mid peripheral and far peripheral areas of the user's field of view. In some embodiments, the paracentral region of the user's field of view is also added. The defined volume represent the possible locations for the selected augmented content.

Where augmented content can reside depends in part on the type of content. Thus, augmented content that is 2-D in nature such as text, video, and so forth can be displayed on a surface of an object within the AR/VR environment. Augmented content that is an object (such as the chair in the scenario of FIGS. 1-4) requires a volume of space within the AR/VR world. By considering the type of content, the system can calculate where the content will fit within the AR/VR environment by defining a proxy object of the same size (e.g., a "flat" surface where the text will fit, a volume where the object can reside within, and so forth) and identifying locations where the proxy object will fit and be viewable within the periphery of the user.

Additionally, or alternatively, operation 1004 can have selection criteria that will eliminate some locations without needing to consider them further. As one example, the system can begin searching in the most likely locations and end the location search after a given number of locations have been identified (or after all potential locations have been considered). Using this example, if the scoring system (operation 1008 below) tends to favor locations within the user's mid peripheral region and that are perpendicular to a line that connects the user's mid periphery to a surface on the augmented content, then those locations can be searched first and the search terminated after an appropriate number of candidate locations have been identified.

After the locations where the augmented content in the AR/VR environment have been identified, operation 1006 begins a loop over each location.

Operation 1008 the calculates scores for the candidate location under consideration. A score can be based so that locations that are more favorable are given higher scores. For example, scores can be based on an aggregation of angular distance from a designated peripheral location, distance from the user, obstructions between the user and the location, orientation relative to the user, and other factors.

To calculate the angular deviation score (i.e., angular distance from the location to a designated peripheral location), embodiments can have a more desirable peripheral region for augmented content. For example, in one embodiment placing objects in the mid peripheral region may be better than placing objects in the near or far peripheral regions. In other embodiments, other regions may be selected. The desired region can be set as the region where the angular distance score is maximized and the angular distance score can fall off for locations outside of this region according to a particular function (e.g. linear) until the edges of the periphery are reached. For example, taking the mid-peripheral region as the score maximum region, the score can be 1 between about 30 degrees and 60 degrees from the center of the user's field of view (i.e., the foveal region). The score can then fall from 1 to 0 as the angular distance goes from about 60 degrees to about 100 degrees or 110 degrees (the outer limit of the far peripheral region) and from about 30 degrees to about 4 degrees (the inner limit of the near peripheral region). The shape of the roll-off 1-0 as the angle varies determines how quickly the score goes to zero with angular deviation. Any desired roll-off can be used.

The distance from the user to the potential location can be calculated and normalized so that a more desirable distance maximizes the score and less desirable distances have lesser scores. Thus, if user's tend to notice, but not be distracted by, objects that are at least as close as the object holding the user's attention and no farther away than a maximum distance, those distances can be set to be the maximum score (i.e., 1) and distances that are closer or farther will have lesser scores, such as explained in conjunction with the angular distance score above.

Locations that are obstructed may not make good candidate locations, so locations that are obstructed can be eliminated from consideration or give a relatively low score, based on how desirable they would be.

Finally, orientation to the user can play a factor in how noticeable augmented content is. Thus, an orientation score can be calculated with better orientations having comparably higher scores and less desirable orientations having comparably lower scores. Just as in the distance or angular deviation scores, research can identify orientations that are better in the sense that they allow the user to notice the augmented content but not be distracted by the augmented content. These orientations can be given higher scores, while orientations that either make it difficult to notice the content or that distract the user can be given lesser scores. The methodology of assigning scores can be the same as in the distance and/or angular deviation explanations above.

The type of augmented content and whether it is displayed in a flat 2-D representation in the AR/VR environment or a 3-D object in the AR/VR environment can influence how the scores are calculated. For example, orientation may be very important for a 2-D representation and less important for a 3-D representation. Thus, the method to calculate the score for a "flat" 2-D display of content can be different than a method to calculate the score for a volume where a 3-D object will reside. The differences can be in how the individual factors are weighted, which factors are used in the calculation, and/or how the individual factors are calculated. This, if 3-D objects tend to be relatively insensitive to orientation in terms of user recognition and/or distraction, then orientation can hold a reduced weight or be eliminated in the calculation of the score for 3-D objects. On the other hand, orientation will be important for 2-D display of augmented content and thus the orientation score can hold increased significance in the corresponding score calculation.

Operation 1010 ends the loop. Once all candidate locations have been examined and scores calculated, operation 1012 selects the highest scoring location(s) for the augmented content to be displayed.

The method ends at operation 1014.

Example Machine Architecture and Machine-Readable Medium

Figure 11:
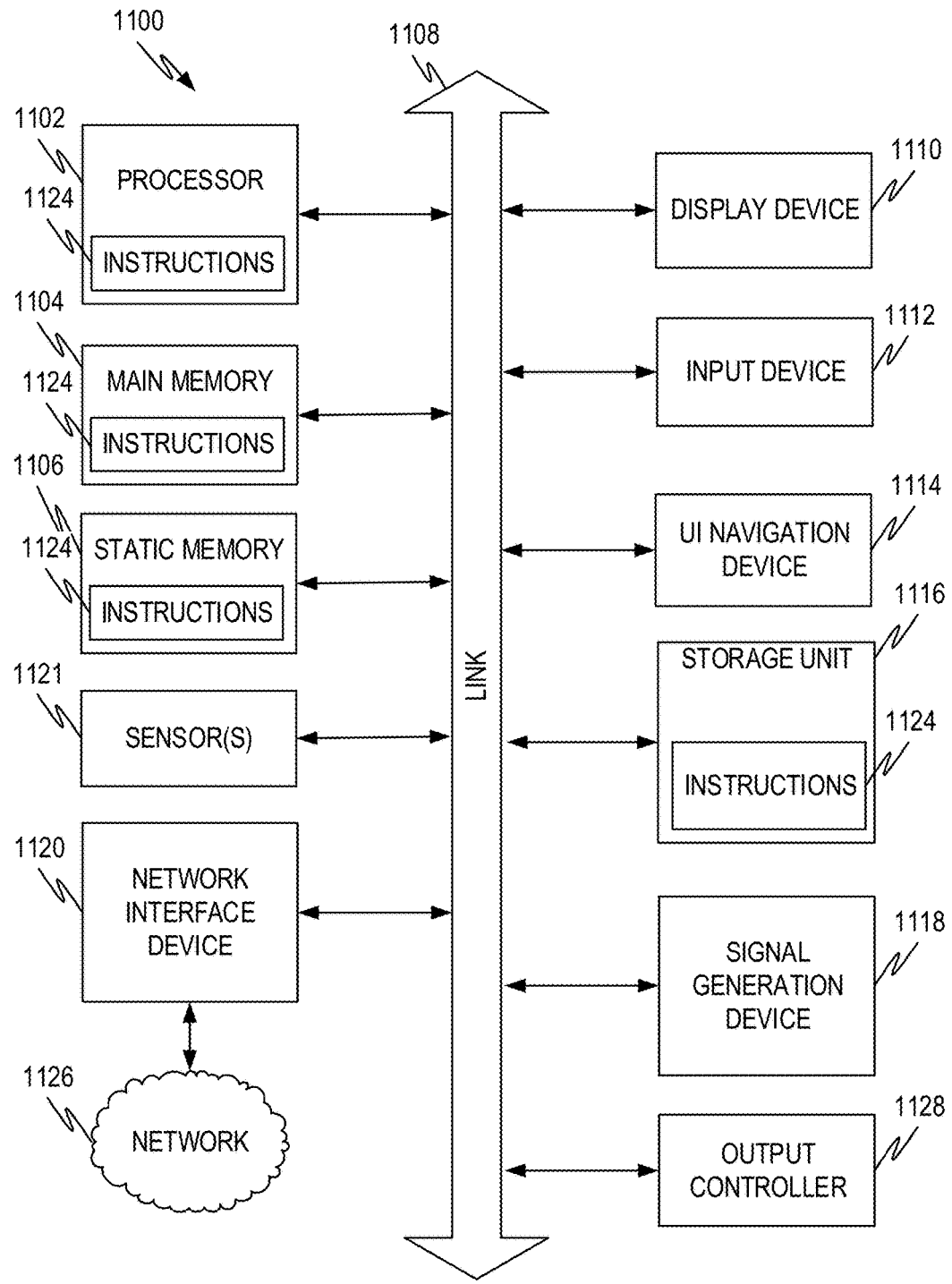
FIG. 11 illustrates a representative machine architecture suitable for implementing the systems and other aspects disclosed herein or for executing the methods disclosed herein.

FIG. 11 illustrates a representative machine architecture suitable for implementing the systems and other aspects disclosed herein or for executing the methods disclosed herein. The machine of FIG. 11 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 11 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1100 includes at least one processor 1102 (e.g., a central processing unit (CPU), a graphics processing unit (GPU), advanced processing unit (APU), or combinations thereof), one or more memories such as a main memory 1104, a static memory 1106, or other types of memory, which communicate with each other via link 1108. Link 1108 may be a bus or other type of connection channel. The machine 1100 may include further optional aspects such as a graphics display unit 1110 comprising any type of display. The machine 1100 may also include other optional aspects such as an alphanumeric input device 1112 (e.g., a keyboard, touch screen, and so forth), a user interface (UI) navigation device 1114 (e.g., a mouse, trackball, touch device, and so forth), a storage unit 1116 (e.g., disk drive or other storage device(s)), a signal generation device 1118 (e.g., a speaker), sensor(s) 1121 (e.g., global positioning sensor, accelerometer(s), microphone(s), camera(s), and so forth), output controller 1128 (e.g., wired or wireless connection to connect and/or communicate with one or more other devices such as a universal serial bus (USB), near field communication (NFC), infrared (IR), serial/parallel bus, etc.), and a network interface device 1120 (e.g., wired and/or wireless) to connect to and/or communicate over one or more networks 1126.

Executable Instructions and Machine-Storage Medium

The various memories (i.e., 1104, 1106, and/or memory of the processor(s) 1102) and/or storage unit 1116 may store one or more sets of instructions and data structures (e.g., software) 1124 embodying or utilized by any one or more of the methodologies or functions described herein. These instructions, when executed by processor(s) 1102 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method for presenting content in a virtual or augmented reality environment, comprising:
selecting one or more bots to provide augmented content to be placed into an augmented reality or virtual reality (AR/VR) environment;
receiving augmented content from the selected bots;
selecting a location to place the augmented content within the AR/VR environment based on the AR/VR environment, the location being within a peripheral view of a user of the AR/VR environment;
identifying a first rendering fidelity based one or more of the location and the AR/VR environment;
sending the augmented content to a rendering service along with the first rendering fidelity;
monitoring user interest in the augmented content;
identifying a second rendering fidelity based on a change in user interest in the augmented content; and
sending the second rendering fidelity to the rendering service to change the rendering fidelity of the augmented based on user interest.

Example 2

The method of example 1 wherein selecting one or more bots is based on an emotional state of the user.

Example 3

The method of example 2 further comprising:
classifying the emotional state to one of a plurality of emotional state classes;
responsive to the emotional state falling within a designated class, terminating the method without placing content into the AR/VR environment.

Example 4

The method of example 1 wherein selecting one or more bots further comprises:
for each domain of a plurality of domains, querying a bot registry to identify known bots;
calculating a score for each identified bot;
selecting a subset of identified bots based on the calculated score.

Example 5

The method of example 4 wherein the calculated score is based on an emotional state of the user.

Example 6

The method of example 1 wherein the selected bots a plurality of bots.

Example 7

The method of example 1 wherein the selected bots comprise a single bot that provides multiple pieces of augmented content.

Example 8

The method of example 1 wherein selecting the location further comprises:
identifying a plurality of candidate locations within the AR/VR environment;
calculating a location score for each candidate location based on the candidate location within the user's field of view and the focus of the user;
selecting the location as the candidate location with the highest score.

Example 9

The method of example 1, 2, 3, 4, 5, 6, 7, or 8 wherein the first rendering fidelity and the second rendering fidelity comprise one or more of:
amount of augmented content;
color of the content;
resolution of the content; and
transparency of the content.

Example 10

A system comprising a processor and computer executable instructions, that when executed by the processor, cause the system to perform acts comprising:
select one or more bots to provide content to be placed into an augmented reality or virtual reality (AR/VR) environment
receive content from the selected bots and deriving augmented content from the content;
select a location to place the augmented content within the AR/VR environment based on the AR/VR environment, the location being within a peripheral view of a user of the AR/VR environment;
identify a first rendering fidelity based one or more of the location and the AR/VR environment;
send the augmented content to a rendering service along with the first rendering fidelity;
monitor user interest in the augmented content;
identify a second rendering fidelity based on a change in user interest in the augmented content; and
send the second rendering fidelity to the rendering service to change the rendering fidelity of the augmented content based on user interest.

Example 11

The system of example 10 wherein select one or more bots is based on an emotional state of the user.

Example 12

The system of example 11 further comprising:
classifying the emotional state to one of a plurality of emotional state classes;
responsive to the emotional state falling within a designated class, terminating the method without placing content into the AR/VR environment.

Example 13

The system of example 10, 11, or 12 wherein selecting one or more bots further comprises:
for each domain of a plurality of domains, query a bot registry to identify known bots;
calculate a score for each identified bot;
select a subset of identified bots based on the calculated score.

Example 14

The system of example 13 wherein the calculated score is based on an emotional state of the user.

Example 15

The system of example 10 wherein the selected bots comprises a broker bot and wherein the broker bot provides the content.

Example 16

A computer implemented method for presenting content in a virtual or augmented reality environment, comprising:
selecting one or more bots to provide augmented content to be placed into an augmented reality or virtual reality (AR/VR) environment (608, 610);
receiving augmented content from the selected bots (612);
selecting a location to place the augmented content within the AR/VR environment based on the AR/VR environment, the location being within a peripheral view of a user of the AR/VR environment (616);
identifying a first rendering fidelity based one or more of the location and the AR/VR environment (618);
sending the augmented content to a rendering service along with the first rendering fidelity (620);
monitoring user interest in the augmented content (706);
identifying a second rendering fidelity based on a change in user interest in the augmented content (708, 710, 712); and
sending the second rendering fidelity to the rendering service to change the rendering fidelity of the augmented based on user interest (714).

Example 17

The method of example 16 wherein selecting one or more bots is based on an emotional state of the user.

Example 18

The method of example 17 further comprising:
classifying the emotional state to one of a plurality of emotional state classes;
responsive to the emotional state falling within a designated class, terminating the method without placing content into the AR/VR environment.

Example 19

The method of example 16, 17 or 18 wherein selecting one or more bots further comprises:
for each domain of a plurality of domains, querying a bot registry to identify known bots;
calculating a score for each identified bot;
selecting a subset of identified bots based on the calculated score.

Example 20

The method of example 19 wherein the calculated score is based on an emotional state of the user.

Example 21

The method of example 16, 17, 18, 19 or 20 wherein the selected bots a plurality of bots.

Example 22

The method of example 16, 17, 18, 19 or 20 wherein the selected bots comprise a single bot that provides multiple pieces of augmented content.

Example 23

The method of example 16, 17, 18, 19, 20, 21 or 22 wherein selecting the location further comprises:
identifying a plurality of candidate locations within the AR/VR environment;
calculating a location score for each candidate location based on the candidate location within the user's field of view and the focus of the user;
selecting the location as the candidate location with the highest score.

Example 24

The method of example 16, 17, 18, 19, 20, 21, 22 or 23 wherein the first rendering fidelity and the second rendering fidelity comprise one or more of:
amount of augmented content;
color of the content;
resolution of the content; and
transparency of the content.

Example 25

The method of example 16, 17, 18, 19, 20, 21, 22, 23 or 24 wherein the selected bots comprises a broker bot and wherein the broker bot provides the content.

Example 26

The method of example 16, 17, 18, 19, 20, 21, 22, 23, 24, or 25 wherein the user interest is increased and wherein the change in fidelity causes rendering at a higher level of fidelity.

Example 27

The method of example 16, 17, 18, 19, 20, 21, 22, 23, 24, or 25 wherein the user interest is decreased and wherein the change in fidelity causes rendering at a lower level of fidelity.

Example 28

The method of example 16, 17, 18, 19, 20, 21, 22, 23, 24, or 25 wherein the user interest is remains the same and wherein the change in fidelity causes rendering at the same level of fidelity.

Example 29

An apparatus comprising means to perform a method as in any preceding example.

Example 30

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A computer implemented method for presenting content in a virtual or augmented reality environment, comprising:
selecting one or more bots to provide augmented content to be placed into an augmented reality or virtual reality (AR/VR) environment;
receiving augmented content from the selected bots;
selecting a location to place the augmented content within the AR/VR environment based on the AR/VR environment, the location being within a peripheral view of a user of the AR/VR environment;
identifying a first rendering fidelity based one or more of the location and the AR/VR environment;
sending the augmented content to a rendering service along with the first rendering fidelity;
monitoring user interest in the augmented content;
identifying a second rendering fidelity based on a change in user interest in the augmented content; and
sending the second rendering fidelity to the rendering service to change the rendering fidelity of the augmented based on user interest.

2. The method of claim 1 wherein selecting one or more bots is based on an emotional state of the user.

3. The method of claim 2 further comprising:
classifying the emotional state to one of a plurality of emotional state classes;
responsive to the emotional state falling within a designated class, terminating the method without placing content into the AR/VR environment.

4. The method of claim 1 wherein selecting one or more bots further comprises:
for each domain of a plurality of domains, querying a bot registry to identify known bots;
calculating a score for each identified bot;
selecting a subset of identified bots based on the calculated score.

5. The method of claim 4 wherein the calculated score is based on an emotional state of the user.

6. The method of claim 1 wherein the selected bots a plurality of bots.

7. The method of claim 1 wherein the selected bots comprise a single bot that provides multiple pieces of augmented content.

8. The method of claim 1 wherein selecting the location further comprises:
 identifying a plurality of candidate locations within the AR/VR environment;
 calculating a location score for each candidate location based on the candidate location within the user's field of view and the focus of the user;
 selecting the location as the candidate location with the highest score.

9. The method of claim 1 wherein the first rendering fidelity and the second rendering fidelity comprise one or more of:
 amount of augmented content;
 color of the content;
 resolution of the content; and
 transparency of the content.

10. A system comprising a processor and computer executable instructions, that when executed by the processor, cause the system to perform acts comprising:
 select one or more bots to provide content to be placed into an augmented reality or virtual reality (AR/VR) environment
 receive content from the selected bots and deriving augmented content from the content;
 select a location to place the augmented content within the AR/VR environment based on the AR/VR environment, the location being within a peripheral view of a user of the AR/VR environment;
 identify a first rendering fidelity based one or more of the location and the AR/VR environment;
 send the augmented content to a rendering service along with the first rendering fidelity;
 monitor user interest in the augmented content;
 identify a second rendering fidelity based on a change in user interest in the augmented content; and
 send the second rendering fidelity to the rendering service to change the rendering fidelity of the augmented content based on user interest.

11. The system of claim 10 wherein select one or more bots is based on an emotional state of the user.

12. The system of claim 11 further comprising:
 classifying the emotional state to one of a plurality of emotional state classes;
 responsive to the emotional state falling within a designated class, terminating the method without placing content into the AR/VR environment.

13. The system of claim 10 wherein selecting one or more bots further comprises:
 for each domain of a plurality of domains, query a bot registry to identify known bots;
 calculate a score for each identified bot;
 select a subset of identified bots based on the calculated score.

14. The system of claim 13 wherein the calculated score is based on an emotional state of the user.

15. The system of claim 10 wherein the selected bots comprises a broker bot and wherein the broker bot provides the content.

16. The system of claim 10 wherein the selected bots comprise a single bot that provides multiple pieces of augmented content.

17. The system of claim 10 wherein select the location further comprises:
 identify a plurality of candidate locations within the AR/VR environment;
 calculate a location score for each candidate location based on the candidate location within the user's field of view and the focus of the user;
 select the location as the candidate location with the highest score.

18. The system of claim 10 wherein the first rendering fidelity and the second rendering fidelity comprise one or more of:
 amount of augmented content;
 color of the content;
 resolution of the content; and
 transparency of the content.

19. A computer storage medium comprising executable instructions that, when executed by a processor of a machine, cause the machine to perform acts comprising:
 select one or more bots to provide content to be placed into an augmented reality or virtual reality (AR/VR) environment based on an emotional state of a user;
 receive content from the selected bots and deriving augmented content from the content;
 select a location to place the augmented content within the AR/VR environment based on the AR/VR environment, the location being within a peripheral view of the user of the AR/VR environment;
 identify a first rendering fidelity based one or more of the location and the AR/VR environment;
 send the augmented content to a rendering service along with the first rendering fidelity;
 monitor user interest in the augmented content;
 identify a second rendering fidelity based on a change in user interest in the augmented content; and
 send the second rendering fidelity to the rendering service to change the rendering fidelity of the augmented content based on user interest.

20. The medium of claim 19 further wherein the first rendering fidelity and the second rendering fidelity comprise one or more of:
 amount of augmented content;
 color of the content;
 resolution of the content; and
 transparency of the content.

* * * * *